US009734973B2

(12) United States Patent
Raciti et al.

(10) Patent No.: US 9,734,973 B2
(45) Date of Patent: Aug. 15, 2017

(54) ELECTRIC SWITCHING DEVICE

(71) Applicant: ABB S.p.A., Milan (IT)

(72) Inventors: Luca Raciti, Bergamo (IT); Romano Manzoli, Caponago (IT)

(73) Assignee: ABB S.P.A. (IT)

( * ) Notice: Subject to any disclaimer, the term of this patent is extended or adjusted under 35 U.S.C. 154(b) by 952 days.

(21) Appl. No.: 13/940,798

(22) Filed: Jul. 12, 2013

(65) Prior Publication Data

US 2013/0300217 A1 Nov. 14, 2013

Related U.S. Application Data

(63) Continuation of application No. PCT/EP2012/051471, filed on Jan. 30, 2012.

(30) Foreign Application Priority Data

Feb. 3, 2011 (IT) .............................. BG2011A0004

(51) Int. Cl.
*H01H 3/00* (2006.01)
*H01H 71/04* (2006.01)
*H01H 71/46* (2006.01)

(52) U.S. Cl.
CPC .......... *H01H 71/04* (2013.01); *H01H 71/465* (2013.01); *H01H 2300/03* (2013.01);
(Continued)

(58) Field of Classification Search
CPC .. H01H 71/04; H01H 71/465; H01H 2300/03; Y10T 307/937; Y04S 20/14; Y02B 90/224
(Continued)

(56) References Cited

U.S. PATENT DOCUMENTS 6,445,087 B1 * 9/2002 Wang ................... H01R 25/003
307/139
6,839,790 B2 * 1/2005 Barros De
Almeida ............. H04L 12/5692
710/305

(Continued)

OTHER PUBLICATIONS

International Search Report (PCT/ISA/210) issued on Apr. 25, 2012, by the European Patent Office as the International Searching Authority for International Application No. PCT/EP2012/051471.

(Continued)

*Primary Examiner* — Richard Tan
(74) *Attorney, Agent, or Firm* — Taft Stettinius & Hollister LLP

(57) ABSTRACT

An electric switching device for a low voltage circuit includes an electronic unit configured to be operatively connected to a first communication bus implementing a first communication protocol, a communication module configured to be operatively connected to the first communication bus and to a second communication bus implementing a second communication protocol, which is different than the first communication protocol. The communication module is configured to place the first communication bus in communication with the second communication bus, and to detect a condition of the switching device and make it available externally thereto by means of the first communication bus and/or the second communication bus.

19 Claims, 7 Drawing Sheets

(52) U.S. Cl.
CPC .............. *Y02B 90/224* (2013.01); *Y04S 20/14* (2013.01); *Y10T 307/937* (2015.04)

(58) Field of Classification Search
USPC .................................. 307/139, 116; 200/308
See application file for complete search history.

(56) References Cited

U.S. PATENT DOCUMENTS

| | | | |
|---|---|---|---|
| 7,246,193 B2 * | 7/2007 | Rotvold ............. | G05B 19/4186 710/305 |
| 7,479,858 B1 | 1/2009 | Baurand et al. | |
| 2005/0128034 A1 | 6/2005 | Rodriguez et al. | |
| 2005/0228509 A1 * | 10/2005 | James ................. | H04L 12/4625 700/19 |

OTHER PUBLICATIONS

Written Opinion (PCT/ISA/237) issued on Apr. 25, 2012, by the European Patent Office as the International Searching Authority for International Application No. PCT/EP2012/051471.

* cited by examiner

ELECTRIC SWITCHING DEVICE

RELATED APPLICATIONS

This application claims priority as a continuation application under 35 U.S.C. §120 to PCT/EP2012/051471, which was filed as an International Application on Jan. 30, 2012 designating the U.S., and which claims priority to European Application BG2011A000004 filed in Europe on Feb. 3, 2011. The entire contents of these applications are hereby incorporated by reference in their entireties.

FIELD

The present disclosure relates to an electric switching device for a low voltage circuit, for example, to a switching device utilizing communication modules with improved characteristics and functionalities.

BACKGROUND INFORMATION

As is known in the art, electric switching devices installed in low voltage electric circuits (that is to say, for applications with nominal voltages up to 1000 VAC/1500 VDC), for example, circuit breakers, disconnectors, and contactors, which are referred to as "switching devices", can be devices devised to allow the correct operation of specific parts of the electric circuit where they can be installed and of the loads operatively connected thereto.

The switching devices include one or more poles each having a movable contact which can be coupled/decoupled to/from a respective fixed contact. A suitable operating mechanism is configured to operate on the movable contacts to cause the movement thereof from a coupled position with the respective fixed contacts to a separated position with respect to the fixed contacts, and vice-versa.

In accordance with the position assumed by the movable contacts of the poles and the respective operating mechanism, the switching device can assume a closed state (movable contacts are in the coupled position), an open state (movable contacts are in the separated position), or a tripped state (operating mechanism tripped but the movable contacts are in the coupled position).

In general, switching devices include a protection device, for example, an electronic device or protection relay, capable of: detecting (by means of suitable sensors) the operating conditions of the electric circuit where the respective switching device is installed; and in case of faults or overloads, driving the opening of the switching device by acting on the operating mechanism.

In addition to the driving and control functions, the protection device is capable of acquiring and making available the information related to the operating conditions of the electric circuit where the switching device is installed.

In known solutions, the switching device includes an internal communication bus which is operatively connected to the protection device so as to make a communication channel available between the electronic protection device and one or more accessory electronic devices.

Among the accessory devices utilized, there are foreseen communication modules capable of placing in communication, that is to say interfacing, the internal bus (and hence the electronic protection device) to a communication bus external to the switching device, even when the communication protocol implemented in the external communication bus is different from the communication protocol implemented in the internal communication bus.

For example, a communication network in an electric circuit can include a first communication bus, or system bus, and a second communication bus, or panel bus, which are operationally connected to a first communication module and a second communication module of a switching device installed in the electric circuit. The first communication module and the second communication module establish the communication interface between the system bus and the panel bus, on one side, and the internal bus of the switching devices in the electric circuit, on the other side.

Although the described solutions can already implement an efficient communication system available to the electronic protection device, there is still room for expanding the functionality and versatility of the communication modules employed, so as to further exploit and improve the communication capabilities already available to the electronic protection device.

SUMMARY

An exemplary embodiment of the present disclosure provides an electrical switching device for a low voltage circuit. The exemplary switching device includes an electronic unit configured to be operatively connected to a first communication bus that implements a first communication protocol. In addition, the exemplary switching device includes a communication module configured to be operatively connected to the first communication bus and to a second communication bus that implements a second communication protocol, which is different than the first communication protocol. The communication module is configured to place the first communication bus in communication with the second communication bus. The communication module is configured to detect a condition relative to the switching device and make it accessible externally thereto through at least one of the first communication bus and the second communication bus.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
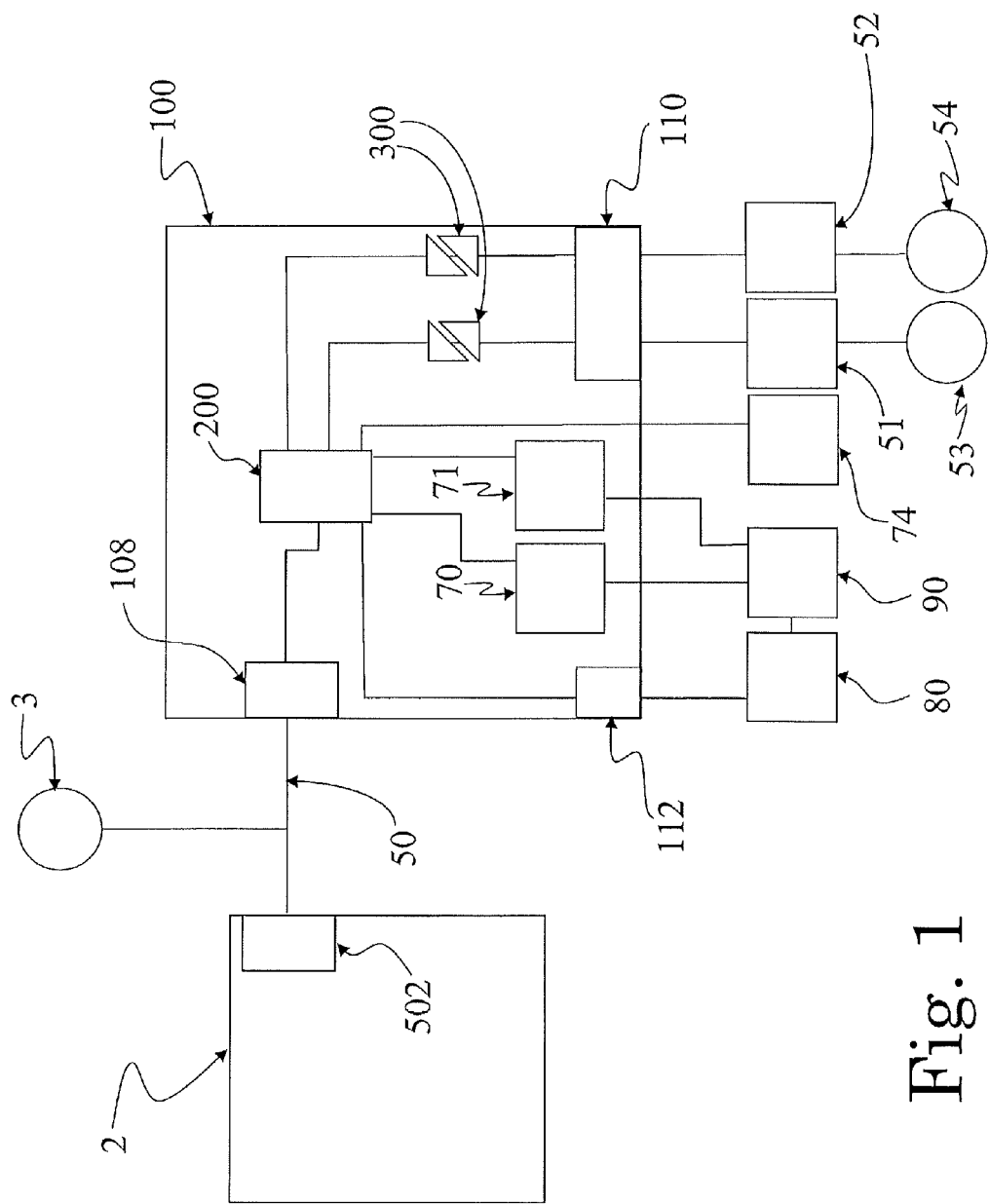
FIG. 1 is a block diagram showing the communication network for a switching device according to an exemplary embodiment of the present disclosure, configured by means of a communication module operatively connected to the protection device of the switching device, and to other devices.

Exemplary embodiments of the present disclosure provide a switching device which overcomes the drawbacks associated with known devices.

For instance, an exemplary embodiment of the present disclosure provides an electric switching device for a low voltage circuit. The electric switching device includes an electronic unit configured to be operatively connected to a first communication bus that implements a first communication protocol, a communication module configured to be operatively connected to a first communication bus and to a second communication bus that implements a second communication protocol, which is different than the first communication protocol.

The communication module is configured to place the first communication bus in communication with the second communication bus.

The communication module is configured in such a manner so as to detect a condition relative to the switching device and make it accessible externally thereto through at least one of the first communication bus and the second communication bus.

The switching device according to the present disclosure will be described in the following in relation to a circuit breaker, as an exemplary embodiment of the present disclosure. Particular reference will be made to a molded case circuit breaker (or MCCB), without however thus limiting the scope of application of the present disclosure to other types of switching devices, disconnectors, contactors, or other types of circuit breaker, for example, air circuit breakers or modular circuit breakers.

With reference to the exemplary embodiments shown in the drawings, a circuit breaker 1, for example, a molded case circuit breaker 1 for low voltage circuits, includes an electronic protection device 2, for example, an electronic relay 2, of the type known in the art and hence not further described. The protection device 2 is configured to be operatively connected, directly or indirectly, to a first communication bus 50, 52 which implements a first communication protocol.

The first communication bus 50, 51 can also be operatively connected, directly or indirectly, to any other electronic unit of circuit breaker 1, other than protection device 2. For example, the first communication bus 50, 51 can be operatively connected to an electronic actuation unit or an electronic alarm unit, for example, a unit which is configured for controlling the turning on and off of luminous indicators to signal a particular state or condition related to circuit breaker 1 itself, such as the open, closed, or tripped state of circuit breaker 1.

The circuit breaker 1 includes a communication module 100 configured to be operatively connected to the first communication bus 50, 52 and a second communication bus 51 which implements a second communication protocol that is different than the first communication protocol.

Communication module 100 is configured to place the first communication bus 50, 52 in communication with the second communication bus 51. In this way, the communication module 100 implements a communication "gateway" function between communication buses implementing different communication protocols.

FIG. 1 schematically shows, through a schematic block diagram, an exemplary architecture of the communication network available to the protection device 2, which is configured by means of the communication module 100. With reference to such communication network, the circuit breaker 1 (see FIG. 4) includes a communication bus 60 internal the circuit breaker 1 itself (indicated in the following for simplicity as "bus 50"), operatively connected, directly, to the protection device 2, so as to make a preferential communication channel available to the protection device 2 itself. In accordance with an exemplary embodiment, the circuit breaker 1 includes an accessory device 3 configured to interact with and/or to extend the functionalities of the protection device 2. The accessory device 3 is operatively connected to the bus 50 so as to communicate with the protection device 2 (see FIG. 1). Among the accessory devices 3 are available for example, electron is devices configured for expanding the inputs and outputs of the protection device 2; and/or electronic devices configured for providing auxiliary interfaces to the protection device 2, for example, a display or a LED interface.

Bus 50 is operatively connected to a communication module 100 of circuit breaker 1, as shown in FIG. 1.

The communication system of the protection device 2 includes a first communication bus 51 external to the circuit breaker 1 (shown schematically in FIG. 1 and indicated in the following for simplicity as "bus 51"), operatively connected to the communication module 100. Bus 51 implements a communication protocol different than the communication protocol of bus 50, and is configured for making a communication channel available between the protection device 2 and one or more devices 53 outside the circuit breaker 1, which are operatively connected to the bus 51 itself (see FIG. 1).

The communication module 100 is configured so as to place the bus 50 in communication with the bus 51. For example, as illustrated in FIG. 1, the communication module 100 includes an electronic processing unit 200, for example, a micro-controller 200 (e.g., a micro-controller of the STM32 family manufactured by the STMicroelectronics), configured for being electrically connected to the bus 50 and the bus 51. The electronic processing unit 200 is configured for reading and translating the information present on bus 50, so as to make it conforming for transmission by means of bus 51, and vice-versa. For example, such reading and translation of the information present on bus 50 and bus 51 occurs by means of a first communication driver (associated with the communication protocol utilized on bus 50) and a second communication driver (associated with the communication protocol utilized on bus 51), which are implemented in and utilized by the electronic processing unit 200 itself.

In this way, the protection device 2 is placed in communication to external devices 53 by means of the communication channel including bus 50 and bus 51.

According to an exemplary embodiment, the communication module 100 is configured so as to place the bus 50, implementing a Fieldbus communication protocol, for example, of the CAN ("controller area network") type, in communication to the bus 51. Alternatively, the communication module 100 can be configured so as to act as a communication gateway for a bus 50, which implements any other communication protocol configured for making a communication channel available to the protection device 2, for example, a communication protocol of the Ethernet type.

In accordance with an exemplary embodiment, the communication module 100 is configured so as to place the bus 50 in communication to the bus 51 which implements a Modbus communication protocol; alternatively, the communication module 100 can be configured so as to act as a communication gateway for bus 51 implementing any other type of communication protocol other than that implemented by bus 50, for example, the Profibus, Profinet, or Modbus TCP communication protocols.

In accordance with an exemplary embodiment, as shown in the example in FIG. 1, the communication network for the protection device 2 includes a second communication bus 52 external to the circuit breaker 1 (indicated in the following for simplicity as "bus 52"), operatively connected to the communication module 100. Bus 52 implements the same communication protocol as bus 50 and is configured for making a communication channel available between the protection device 2 and one or more devices 54 outside the circuit breaker 1, operatively connected to bus 52 itself (see FIG. 1).

The communication module 100 is configured so as to operatively connect bus 52 to the protection device 2, indirectly, through bus 50. For example, bus 52 is electrically connected to the electronic processing unit 200, which is configured for placing in communication each other the bus 52 and the bus 50. In this way, the protection device 2 is connected to external devices 54 by means of the communication channel including bus 50 and bus 52.

Among the external devices 53 and 54 that can be operatively connected to bus 51 and bus 52, respectively, they can be, for example, electric supervisory and control devices, for example, but not limited to, SCADA controllers ("Supervisory Control And Data Acquisition); and/or peripheral electronic devices, such as electronic displays or PLC, as well as combinations thereof.

The communication module 100 acts as a communication gateway between bus 51 and bus 52. In accordance with an exemplary embodiment, the communication module 100 includes electric insulation means 300, or galvanic insulation means 300, placed between bus 51, on one side, and bus 50 (and bus 52, if present), on the other side (see FIG. 1). Due to the insulation means 300, the communication channels are electrically decoupled from one another, so as to guarantee mutual insulation and prevent problems of mutual interference.

In the illustrated examples, circuit breaker 1 includes only one communication module 100 acting as a communication gateway between bus 50 and 52 on one side, and bus 51 on the other side. According to an exemplary embodiment of the present disclosure, in order to respond to the communication requirements between circuit breaker 1 and the exterior, the external devices 53 and/or the external devices 54 can include one or more interface devices between the bus 51 and/or the bus 52 on one side, and other communication buses implemented with a different communication protocol on the other side. For example, bus 51 with the Modbus communication protocol can be operatively connected through an interface device to a bus with the Modbus TCP communication protocol.

Alternatively, several communication modules 100 can be utilized in the same circuit breaker 1 to respond to the external communication requirements. For example, a first communication module 100 can be used acting as a communication gateway between a communication bus 50, 52 of the CAN type and a communication bus 51 of the Modbus type, and a second communication module 100 can be used as a communication gateway between a first communication bus 50, 51 and a second Modbus TCP communication bus.

Alternatively, according to another exemplary embodiment, the communication module 100 itself can be configured to act as a communication gateway between a first communication bus 50, 51 and several second communication buses employing different communication protocols with each other. For example, a single communication module 100 can act as a communication gateway between a first communication bus 50, 51 of the CAN type, and two second communication buses, one of the Modbus type and the other of the Modbus TCP type.

In accordance with an exemplary embodiment, the communication module 100 of the circuit breaker 1 of the present disclosure is configured to detect a condition relative to circuit breaker 1 itself and make it accessible externally thereto by means of bus 50 and/or bus 51 (and/or bus 52, if foreseen).

According to an exemplary embodiment, the communication module 100 includes an auxiliary contact 70, 71 integrated internally thereto and configured to signal a state (open/closed/tripped) of circuit breaker 1. In the examples shown in the drawings, the communication module 100 includes a first auxiliary contact 70 configured for signalling the open or closed state of circuit breaker 1, and a second auxiliary contact 71 configured for signalling the tripped state of circuit breaker 1 (see, for example, FIGS. 1-2).

Figure 3:
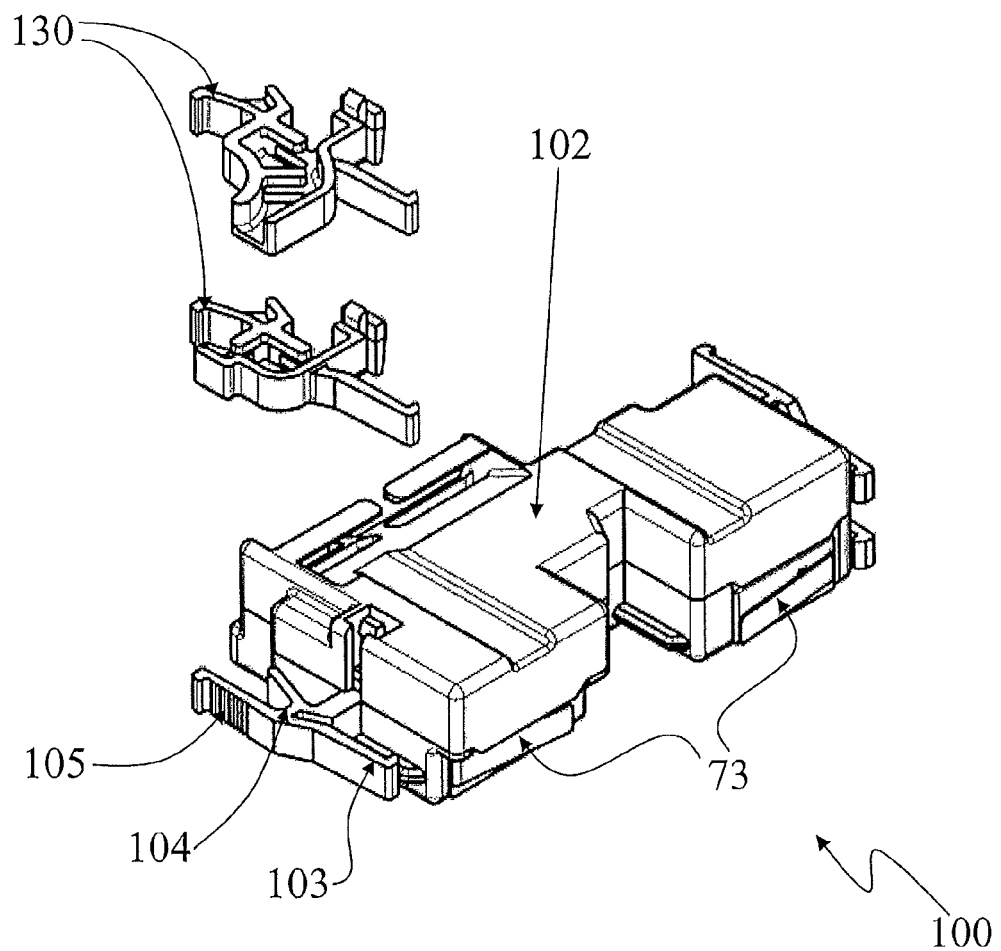
FIG. 3 is an additional perspective view of the communication module in FIG. 2, in the phase with cable adapters, according to an exemplary embodiment of the present disclosure.
Figure 4:
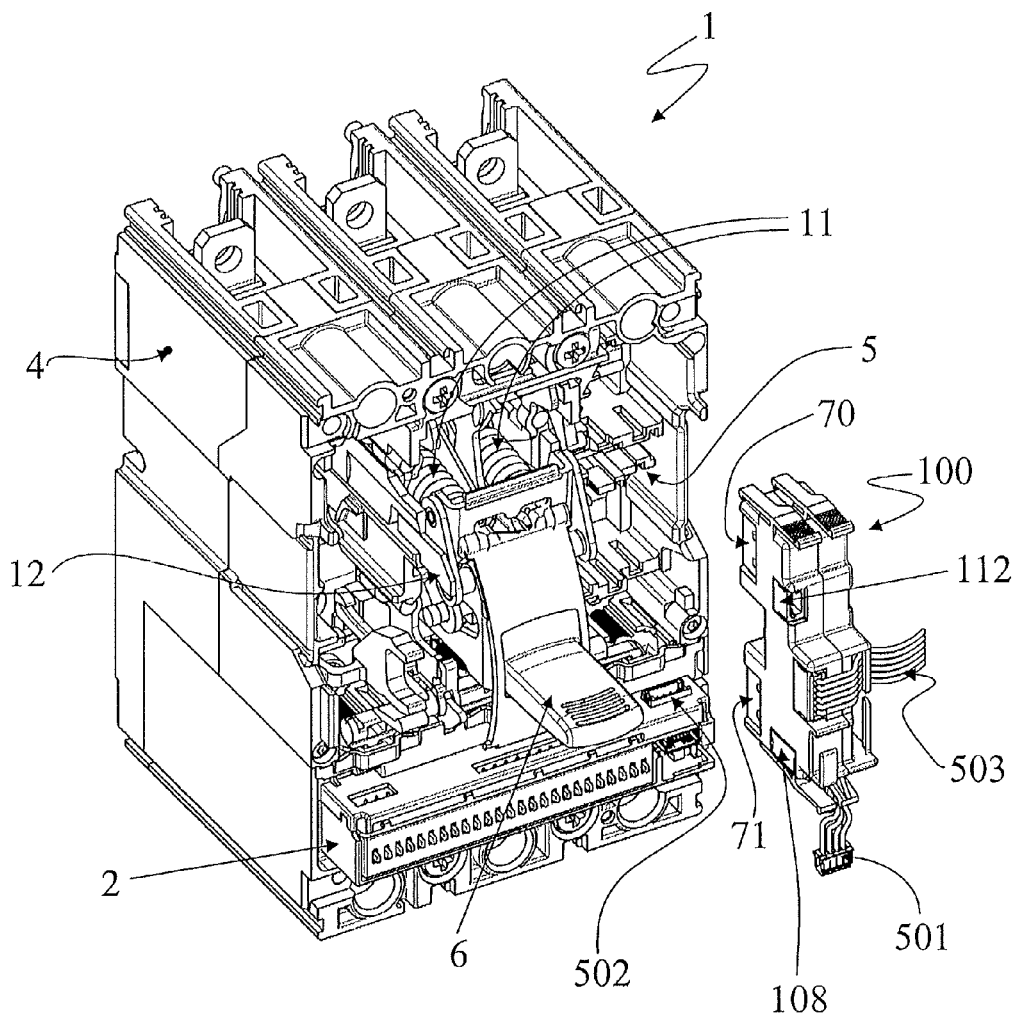
FIG. 4 shows a communication module during the inserting phase into the respective cavity of a switching device according to an exemplary embodiment of the present disclosure.
Figure 5:
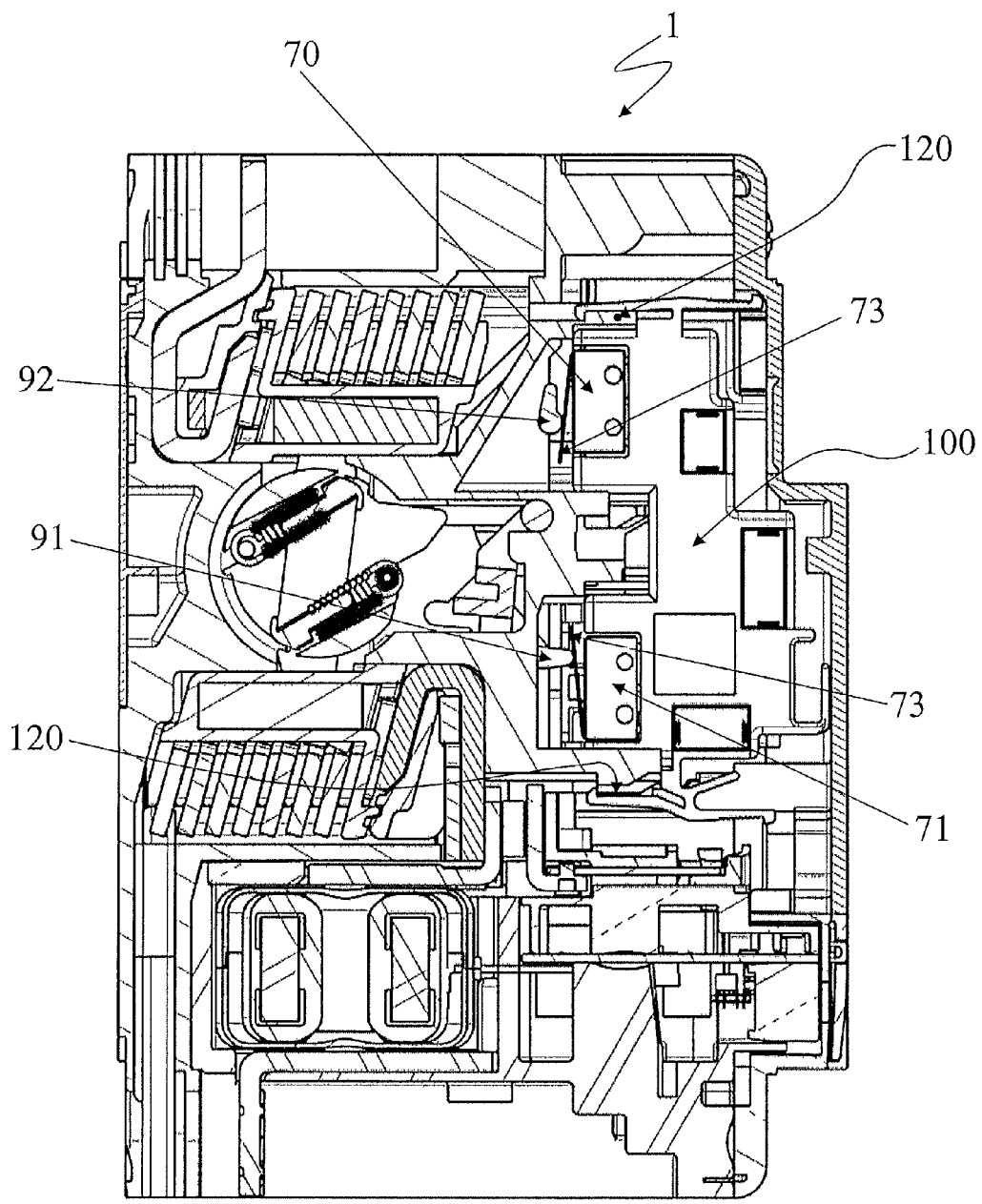
FIG. 5 shows the switching device and the communication device of FIG. 4, wherein the communication module is inserted in the respective cavity of the switching device, according to an exemplary embodiment of the present disclosure.

For example, both the first auxiliary contact 70 and second auxiliary contact 71 are implemented with a micro-switch (not visible in the figures) and an actuator lever 73 (see FIG. 3) which actuates the micro-switch upon itself having being actuated, directly or indirectly, by a movable part of circuit breaker 1, wherein the position of such movable part is indicative of the state of circuit breaker 1 itself (see for example, lever 91 or cam 92 in FIG. 5, operatively connected to the operating mechanism 12 of the circuit breaker 1 shown in FIG. 4).

Alternatively, the communication module 100 can be configured to detect and make available externally thereto a condition related to circuit breaker 1 but different than the state of the circuit breaker 1. For example, the communication module 100 could include means configured for signalling the temperature present inside the circuit breaker 1 during operation, or alternatively means configured for signalling the loaded condition of the springs in the operating mechanism of the circuit breaker 1 (for example, springs 11 of the operating mechanism 12 of the circuit breaker 1 in FIG. 4), or in general other means known in the art for signalling a specific condition related to the circuit breaker 1.

Alternatively, according to another exemplary embodiment, the communication module 100 itself can be configured to detect and make conditions of different types and related to the circuit breaker 1 available externally. For example, the first auxiliary contact 70, the second auxiliary contact 71 and a temperature sensor can be integrated in the same communication module 100.

The state (or condition) of circuit breaker 1 detected by the communication module 100 is made available outside the communication module 100 itself by means of one or more communication buses 50, 51 and 52 (if foreseen). For example, the state (or condition) of the circuit breaker 1 detected by the communication module 100 is made available outside the circuit breaker 1 itself by means of bus 51 and/or bus 52 (if foreseen, as illustrated in FIG. 1) and can be made available to the protection device 2 (or, in general to an electronic unit of the circuit breaker 1) by means of bus 50.

FIG. 1 shows schematically how the first auxiliary contact 70 and second auxiliary contact 71 are operatively connected to the electronic processing unit 200, for example, to a respective input port of electronic processing unit 200 itself by means of dedicated lines, so as to send it an electric signal indicative of a detected state of the circuit breaker 1. The electronic processing unit 200 is configured to monitor the status of such input ports, so as to detect the presence of the transmitted electrical signal and write the information relative to the presence or lack of such electrical signal in a suitable register, ready to be used on bus 50, 51 and 52 according to the needs of request or transmission of the information related to the state of the circuit breaker 1.

According to an exemplary embodiment, the communication module 100 is configured to control the actuator means 80 for causing the opening or closing of the circuit breaker 1, utilizing a signal received by means of bus 50 and/or bus 51 and/or bus 52 (if present, as illustrated in FIG. 1).

The actuator means 80 operatively interact with the movable contacts of the circuit breaker 1 (shown schematically and indicated with numeral reference 90 in FIG. 1), for example, acting on the operating mechanism 12 of the circuit breaker 1 itself. In accordance with an exemplary embodiment, the communication module 100 is configured to control a motor actuator (MOE, "Motor Operated Equipment"); alternatively, the communication module 100 can be configured to control other actuator means known in the art, for example, a solenoid actuator.

Specific signals and messages with indications about how operating the circuit breaker 1 by means of the actuator 80, for example, signals indicative of a closing or opening command of the circuit breaker 1, are sent to respective input ports of the electronic processing unit 200 from bus 50 and/or bus 51 and/or bus 52 (if present, as illustrated in FIG. 1). The electronic processing unit 200 is configured to detect the presence of such signals, and if requested execute the code contained thereof in order to output a signal suitable for controlling the actuator means 80. Such control signal is made available on a respective output port of the electronic processing unit 200, which is electrically connected to the actuator means 80.

The communication module 100 implements the functionality of opening/closing by remote the circuit breaker 1 through the actuator 80, regardless of the presence of the protection device 2. In fact even if the protection device 2 is disconnected from the respective bus 50, the communication module 100 still implements an independent and functioning interface to control by remote the actuator means 80, for example, by means of a supervisory and control system operatively connected to bus 51 and/or bus 52. For this purpose, it needs to be underscored that the power necessary for the communication module 100 is not supplied through the protection module 2; in the example in FIG. 1, the power is supplied from the outside of the circuit breaker 1 through means 74 operatively connected to the communication module 100.

When the protection device 2 is operatively connected to the respective bus 50, it can also control the intervention of the actuator means 80 through the communication module 100.

Advantageously, the communication module 100 is configured to control the actuator means 80 utilizing as useful information also the state of the circuit breaker 1 signalled by the auxiliary contacts 70, 71. For example, the code executed by the electronic processing unit 200 to output the control signal for the actuator means 80 is configured to also use the information related to the state of circuit breaker 1, which is written inside the respective register in the electronic processing unit 200, so as to ascertain the opportunity to perform the operation commanded by remote through bus 51 and/or bus 52.

According to an exemplary embodiment, the circuit breaker 1 includes a containment enclosure, or structure, inside its own casing, where the communication module 100 is located. The containment structure includes a cavity 5 defined inside the casing 4 (see FIGS. 4 and 5). For instance, in the illustrated examples, such cavity 5 is externally accessible after removing the front part of the casing 4 (that is to say, the part from which the actuator lever 6 of circuit breaker 1 leans forward). In the example of FIGS. 4 and 5, the communication module 100 is placed directly inside the respective cavity 5. Alternatively, according to another exemplary embodiment, the containment structure can also include an interface module on which the communication module 100 is mounted, which is in turn inserted in a removable way inside the respective cavity 5.

Body 102 of the communication module 100 includes means for coupling with the respective containment structure (with the cavity 5 in the illustrated examples), and decoupling means operatively connected to the coupling means so as to decouple the coupling means from the containment structure, upon their actuation.

In the examples illustrated in FIGS. 2-6, the coupling means include a first lever arm 103 hinged on an elastic fulcrum portion 104 protruding from the body 102. The first lever arm 103 includes a hooking end 111 configured for coupling with a respective portion 120 of the cavity 5 (see FIG. 5). The decoupling means include a second lever arm 105 operatively connected to first lever arm 103 so as to release the hooking end 111 from the portion 120 of the cavity 5, upon their actuation.

Figure 2:
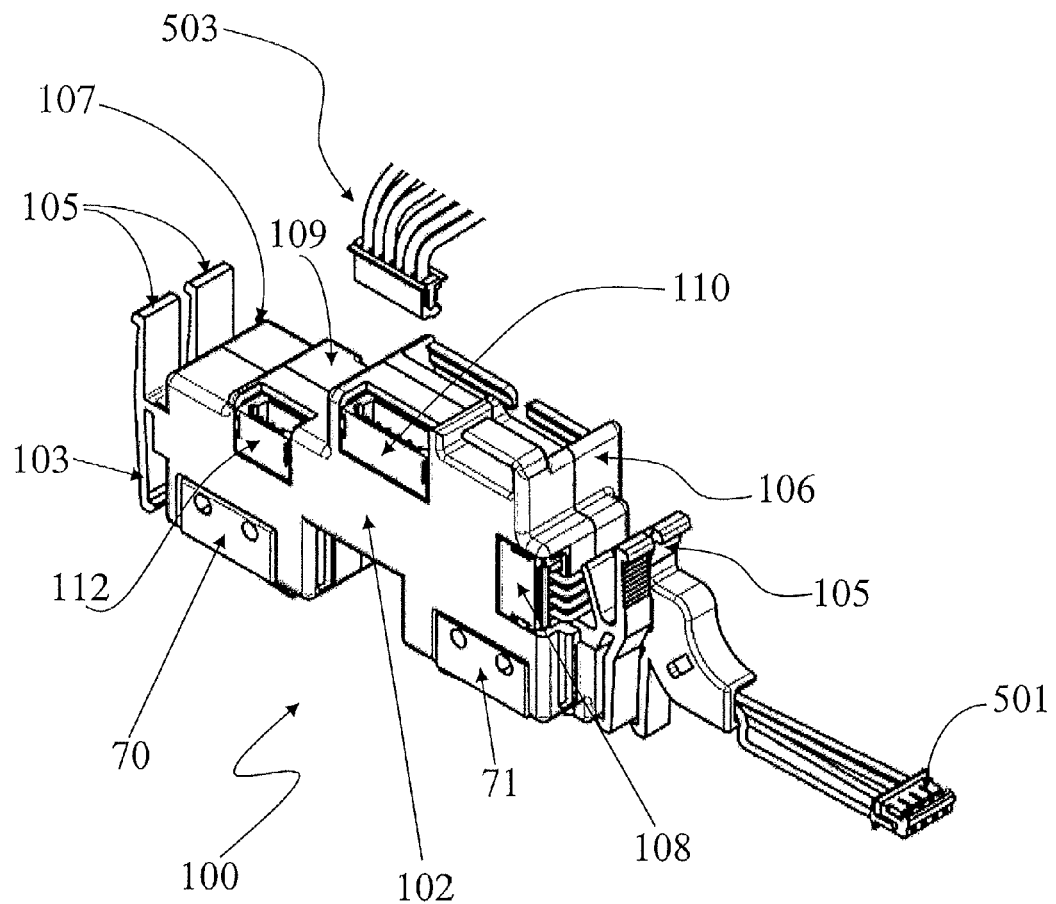
FIG. 2 is a perspective view of a communication module for a switching device according to an exemplary embodiment of the present disclosure.
Figure 6:
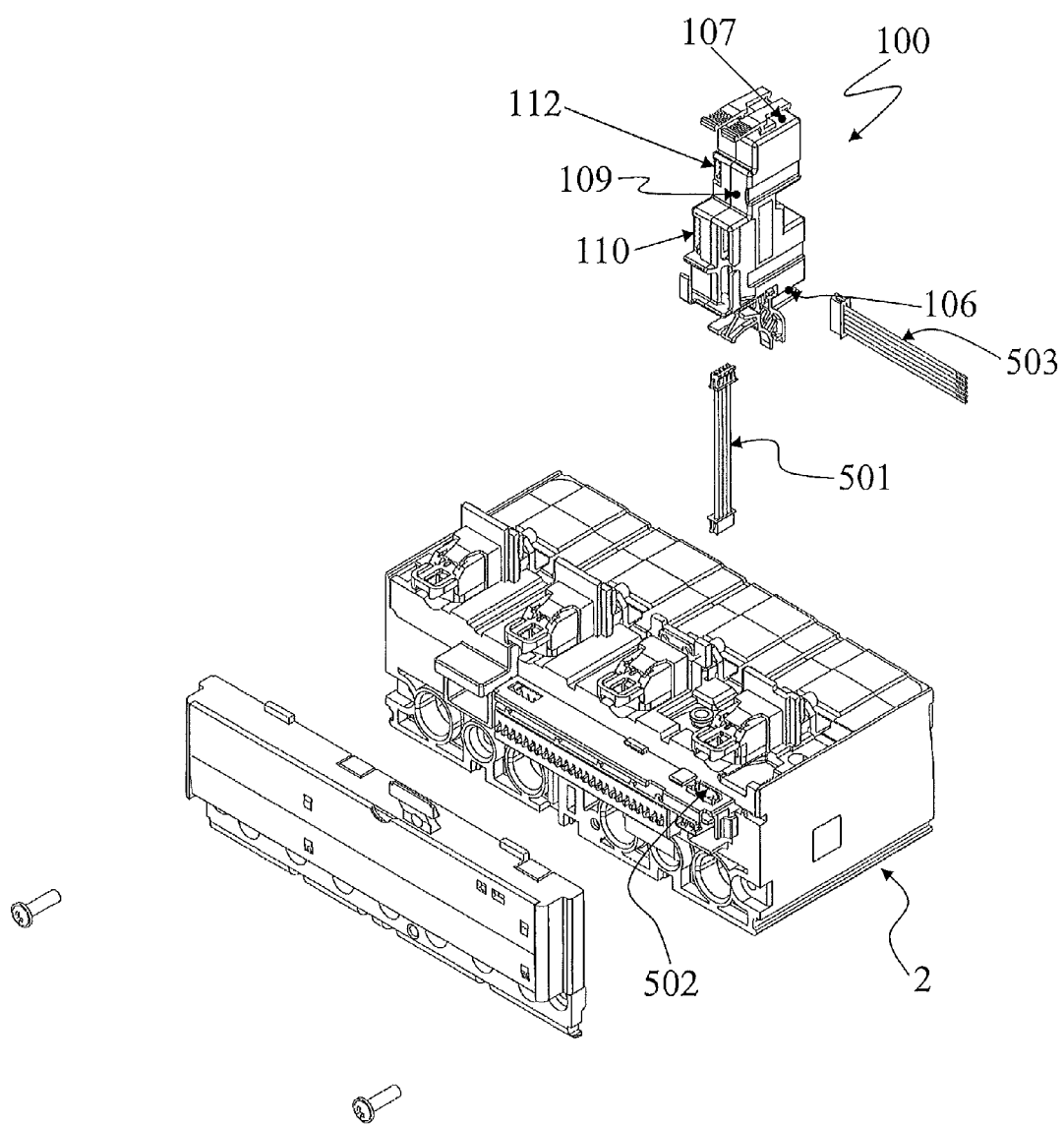
FIG. 6 shows in phase of an assembly, a protection device of a switching device according an exemplary embodiment of the present disclosure, a communication module, and the electrical connectors that implement the communication buses operatively connected to the communication module.

With reference to FIG. 2, the body 102 of the communication module 100 includes a first wall 106 and a second wall 107 opposite each other from which the coupling/decoupling means lean forward. A first connection port 108 is defined on the first wall 106 for the connection to the bus 50, and hence to the protection device 2; the first connection port 108 is electrically connected to the electronic processing unit 200 (see FIG. 1). As illustrated in FIG. 6, the first connection port 108 is connected to a connection port 502 of the protection device 2 by means of a connector 501 implementing the bus 50 at the physical layer.

Advantageously, the cavity 5 is defined inside the casing 4 of the circuit breaker 1 above the protection device 2 and the respective communication module 100 is inserted inside it so that the first wall 106 faces the protection device 2. In this way, it is convenient to connect the first connection port 108 to the connection port 502 of the protection device 2, by means of the connector 501.

With reference to FIG. 2, the body 102 of the communication module 100 includes a third wall 109 cross-connecting the first wall 106 to the second wall 107, on which a second connection port 110 is defined for the connection to both bus 51 and bus 52 (for example, FIG. 4 shows a connector 503 implementing the bus 51 and the bus 52 at the physical layer). The second connection port 110 is electrically connected to the electronic processing unit 200 (see FIG. 1).

A third connection port 112 is further defined on the third wall 109 for the connection to the actuator means 80; such connection port 112 is electrically connected to the electronic processing unit 200 (see FIG. 1).

The communication module 100 is inserted inside the respective cavity 5 so that the third wall 109 is directly accessible by removing the front part of the casing 4. In this way, it is particularly convenient to access the second connection port 110 in order to connect connector 503, and the third connection port 112 in order to connect the actuator means 80, such as for example, a motor actuator coupled to the front of the casing 4 of the circuit breaker 1.

In accordance with an exemplary embodiment, one or more cable adapters 130 are operatively coupled to the body 102 of the communication module 100 to match the respective containment structure defined in circuit breakers 1 of different sizes (for example, FIG. 3 shows a first cable adapter 130 and a second cable adapter 130 to match the body 102 to two circuit breakers 1 of different sizes). Moreover, the cable adapter 130 is configured for guiding and fixing an electrical connector operatively associated to a respective connection port 108, 110, 112.

The auxiliary contacts 70 and 71 are integrated inside the body 102 of the communication module 100, on the opposite part with respect to the second connection port 110 and the third connection port 112 (see FIGS. 2 and 3). The cavity 5 is configured so as to allow the operative interaction between the auxiliary contacts 70 and 71 and the respective movable parts of circuit breaker 1 (see cam 92 and lever 91 in FIG. 5).

In general, switching devices are installed inside electric circuits (for example, those implemented in electric panels), wherein communication networks are foreseen for exchanging communication between the circuit breakers themselves, and the circuit breakers and other devices, whether internal or external to the electric panel. The present disclosure therefore relates to an electric circuit (see for example, the electric panel 500 illustrated in the schematic diagram in FIG. 7) including a first circuit breaker 1 employing a communication module 100 operatively connected to the first communication bus 50, 52 and to the second communication bus 51, wherein the first communication bus 50, 52 is operatively connected to an electronic unit of the first circuit breaker 1, for example, including the protection device 2 of the circuit breaker 1.

The present disclosure is moreover related to an electric circuit (see electric panel 500 in FIG. 7) including a second circuit breaker 1 employing a communication module 100 operatively connected to the first communication bus 50, 52 and to the second communication bus 51, wherein the first communication bus 50, 52 is operatively connected to an electronic unit of the second circuit breaker 1, for example, including the protection device 2 of the circuit breaker 1.

The electronic unit of the first circuit breaker 1 and the electronic unit of the second circuit breaker operatively connected to the first communication bus 50, 52 are configured for communicating with each other by means of first communication bus 50, 52 and/or second communication bus 51.

Figure 7:
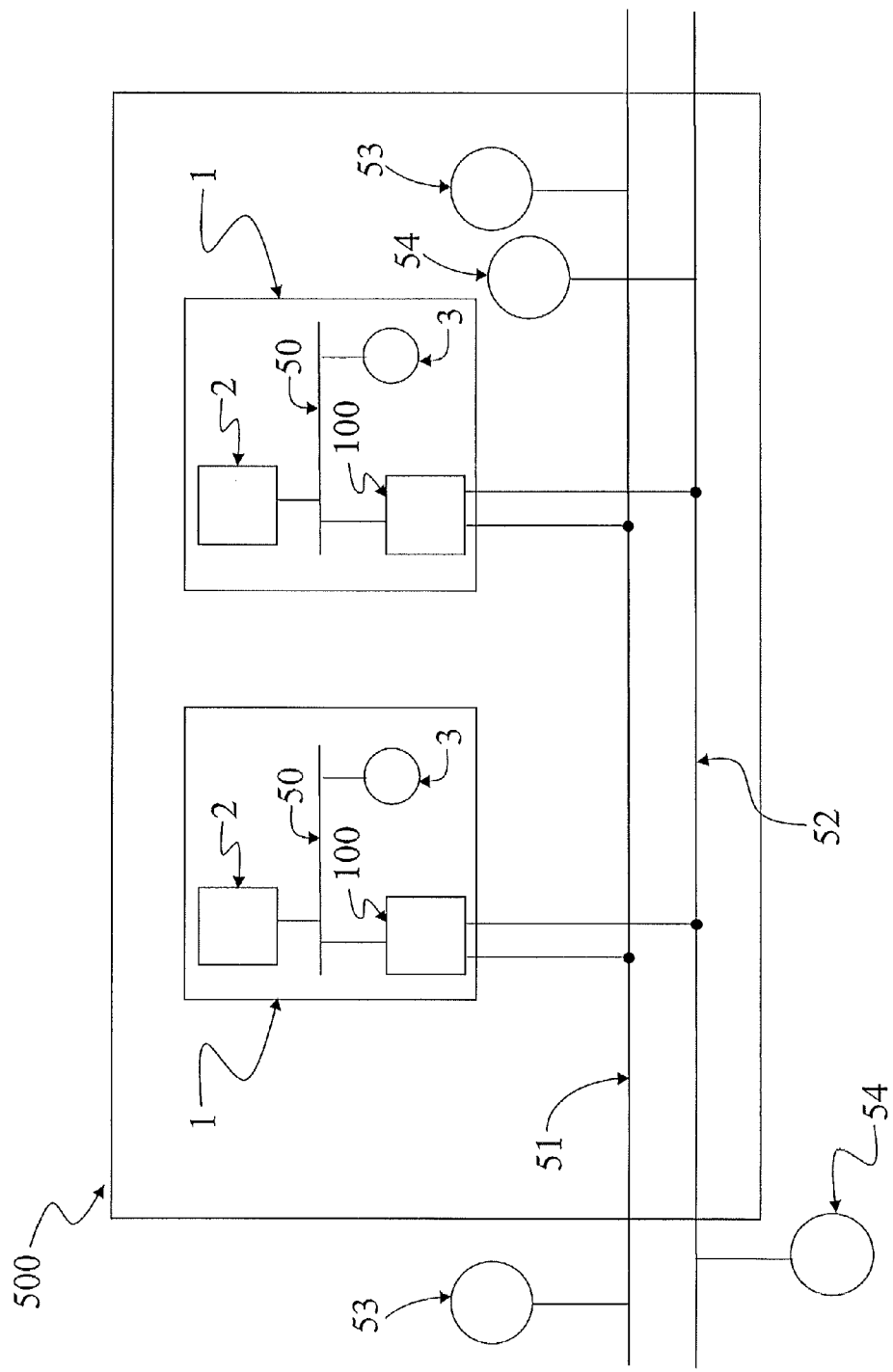
FIG. 7 is a block diagram showing schematically a part of an electric circuit where a plurality of switching devices is installed according to an exemplary embodiment of the present disclosure.

In the schematic diagram of the electric panel 500 in FIG. 7, the protection device 2 of the first circuit breaker 1 and the protection device 2 of the second circuit breaker 1 are operatively connected to the bus 50 inside the first circuit breaker 1 and the second circuit breaker 1, respectively, and are configured for communicating with each other by means of the communication channel made available by buses 50 and bus 51, and by the communication channel made available by buses 50 and bus 52.

The electric panel 500 hence includes a communication network realized by buses 50 inside the circuit breakers 1 in the electric panel 500 (operatively connected to the protection devices 2 of the circuit breakers 1 and/or to other electronic units of the circuit breakers 1 themselves), and by bus 51 and bus 52, outside the circuit breakers 1 themselves.

An external device 53 and/or an external device 54 can be operatively connected to bus 51 and/or bus 52, respectively. For example, a SCADA system, whether inside or outside the electric panel 500, or alternatively a user interface for the electric panel 500, such as for example, an electronic display mounted on the door of the electric panel, can be operatively connected to bus 51 and/or bus 52.

The switching device in the present disclosure completely fulfils the required functions, providing a series of advantages with respect to known techniques.

The communication module 100 is provided with additional functionalities with respect to the functionality of communication gateway already present in the communication modules known in the art, so as to better exploit the potential of the communication resources made available by buses 50 and 51, and by bus 52, if foreseen.

The presence of bus 52 permits increasing the communication potential by making a communication channel available externally to the circuit breaker 1, in addition to the communication channel already made available by bus 51. It is moreover necessary to underscore that bus 52 does not require the communication module 100 to act as a communication gateway, as opposed to bus 51, since it implements the same communication protocol as bus 50. In this way the communication possibilities implemented by the communication module 100 towards the outside of the circuit breaker 1 are overall improved.

The communication module 100 is operatively connected to respective buses 50, 51 (and 52), so as to implement, with a single device, the two following functions which were previously implemented by known communication modules remotely reading the measurements and settings of the protection module 2, remotely programming the protection module 2, and implementing the additional functionality of detecting a condition relative to circuit breaker 1 and making it available externally thereto.

According to an exemplary embodiment described and illustrated in the drawings, the communication module 100 is configured to detect and make the information relative to the condition of the circuit breaker 1 available externally. In this way, such communication module 100 implements the additional functionality to enable the reading by remote of the detected condition of the circuit breaker 1. The reading/programming operations for the protection module 2 and/or reading the condition of the circuit breaker are carried out, for example, by means of supervisory and control devices or by means of suitable user interfaces, such as electronic displays, operatively connected to bus 51 and/or bus 52.

Moreover, the detected condition of the circuit breaker 1 can advantageously be made available to the protection device 2 by means of bus 50, as useful information in the performance of its control functions and/or analysis.

Advantageously, the communication module 100 according to the present disclosure can be configured to implement additional functions in addition to detecting and making information relative to circuit breaker 1 available externally. For example, the communication module 100 can be configured, as previously described, to control the actuator means 80 by utilizing a signal received by means of bus 50 and/or bus 51 and/or bus 52 (see FIG. 1).

With reference to the electric panel 500 in which a plurality of circuit breakers 1 is installed, a single communication module 100 permits to simultaneously interface the respective circuit breaker 1, and for example, its protection module 2, to two buses present on the communication network of electric panel 500, for example, the bus 51 and the bus 52 described above.

In this way, a communication network can be easily configured in the electric panel 500, by means of a few communication modules 100, wherein such communication network is a highly flexible communication network with the capability to exchange data relative to various protection devices 2, control signals for the actuator means 80 of the circuit breakers 1, data relative to the circuit breakers 1, detected by the communication modules 100 themselves.

The solutions described here can be embodied with various modifications and variants, all of which are within the scope of the present disclosure. For example, the communication module 100 illustrated in the figures can be configured to detect only the closed/open state of the circuit breaker 1 by means of a single auxiliary contact, without including an additional auxiliary contact to detect the tripped/not-tripped state of the circuit breaker 1.

Furthermore, the structure of the communication module 100 illustrated in FIGS. 2-5 could be different; for example, with an arrangement and configuration of the connection ports different than that described and illustrated. For example, instead of a single connection port 110 for buses 51 and 52, a connection port for bus 51 and a separate port for bus 52 can be provided.

Even though in the examples illustrated in FIGS. 4 and 5 the communication module 100 is placed in the cavity 5 inside the casing 4 of the circuit breaker 1, the communication module 100 could be placed outside the casing 4; for example, it could be operatively coupled to the external surface of the casing 4 itself. Further, the position of the cavity 5 could be different than in the illustration.

Finally, the type of communication implemented by buses 50, 51, 52 within the scope of the previously described foreseen applications, as well as the means utilized for implementing the buses 50, 51, 52 at the physical layer could vary according to the requirements and the state of the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An electrical switching device for a low voltage circuit, comprising: an electronic unit configured to be operatively connected to a first communication bus that implements a first communication protocol; a communication module configured to be operatively connected to the first communication bus and to a second communication bus that implements a second communication protocol, which is different than the first communication protocol, wherein the communication module is configured to place the first communication bus in communication with the second communication bus, and wherein the communication module is configured to detect a condition relative to the electrical switching device and make it accessible externally thereto through at least one of the first communication bus and the second communication bus; wherein the electrical switching device further includes a first auxiliary contact configured to signal a first characteristic of the electrical switching device and a second auxiliary contact configured to signal a second characteristic of the electrical switching device, wherein the communication module is structured to make the first characteristic and the second characteristic accessible externally thereto through at least one of the first communication bus and the second communication bus.

2. The electrical switching device according to claim 1, wherein the communication module is configured to control actuation means causing opening or closing of the electrical switching device, by using, a signal received through at least one of the first communication bus and the second communication bus.

3. The electrical switching device according to claim 1, wherein the communication module is configured to control the actuation means using a state of the electrical switching device signaled by one of the first and second auxiliary contacts.

4. The electrical switching device according to claim 1, wherein the first communication bus comprises an internal communication bus which is configured to be operatively connected directly to the electronic unit.

5. The electrical switching device according to claim 4, wherein the first communication bus comprises an external communication bus configured to be operatively connected to at least one device external to the electrical switching device, and wherein the communication module is configured to operatively connect the external communication bus to the electronic unit through the internal communication bus.

6. The electrical switching device according to claim 1, wherein the communication module is configured to place the first communication bus, which implements a Fieldbus communication protocol, in communication with the second communication bus.

7. The electrical switching device according to claim 1, wherein the communication module is configured to place the first communication bus in communication with the second communication bus, which implements a Modbus communication protocol.

8. The electrical switching device according to claim 1, comprising: a containment enclosure in which the communication module is housed.

9. An electrical circuit comprising a first electrical switching device which includes all elements and limitations of the electrical switching device according to claim 1.

10. An electrical circuit comprising a first electrical switching device which includes all elements and limitations of the electrical switching device according to claim 1 and a second electrical switching devices which includes all elements and limitations of the electrical switching device according to claim 1, wherein the electronic unit of the first electrical switching device and the electronic unit of the second electrical switching device are configured to communicate with each other through the at least one of the first communication bus and the second communication bus of the respective first and second electrical switching devices.

11. The electrical switching device according to claim 1, wherein the communication module is configured to control actuation means causing opening or closing of the electrical switching device, by using a signal received through at least one of the first communication bus and the second communication bus.

12. The electrical switching device according to claim 11, wherein the communication module is configured to control the actuation means using a state of the electrical switching device signalled by at least one of the first and second auxiliary contacts.

13. The electrical switching device according to claim 12, wherein the first communication bus comprises an internal communication bus which is configured to be operatively connected directly to the electronic unit.

14. The electrical switching device according to claim 13, wherein the first communication bus comprises an external communication bus configured to be operatively connected to at least one device external to the electrical switching device, and wherein the communication module is configured to operatively connect the external communication bus to the electronic unit through the internal communication bus.

15. The electrical switching device according to claim 14, wherein the communication module is configured to place the first communication bus, which implements a Fieldbus communication protocol, in communication with the second communication bus.

16. The electrical switching device according to claim 14, wherein the communication module is configured to place the first communication bus in communication with the second communication bus, which implements a Modbus communication protocol.

17. The electrical switching device according to claim 14, comprising: a containment enclosure in which the communication module is housed.

18. The electrical switching device according to claim 1, wherein the first characteristic and the second characteristic can be a state or a condition of the electrical switching device, and, wherein the first characteristic is a different type than the second characteristic.

19. The electrical switching device according to claim 1, wherein the first characteristic and the second characteristic can be one of: an open state of the electrical switching device, a closed state of the electrical switching device, a tripped state of the electrical switching device, and a temperature of the electrical switching device; and wherein the second characteristic is different from the first characteristic.

* * * * *